United States Patent
Yu et al.

(10) Patent No.: US 9,235,078 B2
(45) Date of Patent: Jan. 12, 2016

(54) CURVATURE ADJUSTMENT STRUCTURE OF CURVED LIQUID CRYSTAL DISPLAY DEVICE

(71) Applicant: Shenzhen China Star Optoelectronics Technology Co., Ltd., Shenzhen, Guangdong (CN)

(72) Inventors: Gang Yu, Guangdong (CN); Yuchun Hsiao, Guangdong (CN); Dehua Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 46 days.

(21) Appl. No.: 14/374,512

(22) PCT Filed: May 28, 2014

(86) PCT No.: PCT/CN2014/078671
§ 371 (c)(1),
(2) Date: Jul. 24, 2014

(87) PCT Pub. No.: WO2015/172404
PCT Pub. Date: Nov. 19, 2015

(65) Prior Publication Data
US 2015/0331275 A1    Nov. 19, 2015

(30) Foreign Application Priority Data

May 14, 2014    (CN) .......................... 2014 1 0204558

(51) Int. Cl.
*G02F 1/1333* (2006.01)

(52) U.S. Cl.
CPC .... *G02F 1/133385* (2013.01); *G02F 1/133308* (2013.01); *G02F 2001/133314* (2013.01)

(58) Field of Classification Search
None
See application file for complete search history.

(56) References Cited

U.S. PATENT DOCUMENTS

2015/0092353 A1*    4/2015    Baik ...................... H05K 1/028
                                                        361/720

\* cited by examiner

*Primary Examiner* — Richard Kim
(74) *Attorney, Agent, or Firm* — Andrew C. Cheng

(57) ABSTRACT

The present invention provides a curvature adjustment structure of a curved liquid crystal display device, which includes: a backplane (1) and at least one bracing assembly (3) fixedly mounted to the backplane (1). Each bracing assembly (3) includes a first bracing member (31) in contact engagement with the backplane (1), a second bracing member (33) opposite to the first bracing member (31) and distant from the backplane (1), and a cooling chip array (35) arranged between the first and second bracing members (31, 33). The cooling chip array (35) includes a plurality of cooling chips (2). Each of the cooling chips (2) includes a heat absorption surface (22) and an opposite heat dissipation surface (24). The heat absorption surface (22) and the heat dissipation surface (24) of each of the cooling chips (2) are respectively in engagement with the first and second bracing members (31, 33), whereby through energizing the cooling chip array (35), the first and second bracing members (31, 33) are respectively caused to undergo thermal expansion and contraction to achieve curving and deformation of the bracing assembly (3) so as to forcibly change the curvature of the backplane (1).

15 Claims, 6 Drawing Sheets

CURVATURE ADJUSTMENT STRUCTURE OF CURVED LIQUID CRYSTAL DISPLAY DEVICE

BACKGROUND OF THE INVENTION

1. Field of the Invention

The present invention relates to the field of liquid crystal displaying, and in particular to a curvature adjustment structure of a curved liquid crystal display device.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

A liquid crystal display device generally comprises an enclosure, a liquid crystal panel arranged in the enclosure, and a backlight module mounted in the enclosure. The principle of operation of the liquid crystal panel is that liquid crystal molecules are arranged between two parallel glass substrates and a plurality of vertical and horizontal tiny electrical wires are arranged between the two glass substrates and electricity is applied to control the liquid crystal molecules to change direction in order to refract light emitting from the backlight module to pass through a pixel structure formed on the glass substrates to generate a color image. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel and light is homogenized by a diffusion plate to form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, with the progress of the liquid crystal displaying technology, major manufacturers have marketed curved liquid crystal display devices one after another. Generally speaking, the curved liquid crystal display devices allow for the best viewing effect from edge to edge, while a regular liquid crystal display device has poor capability of displaying at edges of a screen. The curved liquid crystal display devices has a screen that is entirely of a curved design to provide a wide full-view image, allowing for the same visual enjoyment at both the central portion and the circumferential portion of the screen and also reducing distortion of off-axis viewing for viewing at a short distance. Further, the curved liquid crystal display device allows a viewer's viewing distance to be extended, achieving better experience of viewing. Thus, compared to the regular liquid crystal display devices, the curved liquid crystal display devices have advantages, including: (1) brand differentiating, (2) wider viewable angle, and (3) reducing distortion for short distance viewing.

The conventional ways of forming a curved liquid crystal display device generally include: (1) mounting a support rack having a specific curve to a backplane to force the backplane to deform into a curve consistent with that of the rack; and (2) directly forming a structure of a curved surface on the backplane. However, the curvature of a liquid crystal display device obtained with both of the two ways is fixed and no adjustment is available to suit the need of watching of a user, whereby the view angle is subjected to undesired constraint and the structure is relatively complicated, making the cost high.

SUMMARY OF THE INVENTION

An object of the present invention is to provide a curvature adjustment structure of a curved liquid crystal display device, which allows for easy, efficient, and continuous adjustment of the curvature of a curved liquid crystal display device to achieve different conditions of displaying to suit different needs so as to improve the appeal of products to the market and make the structure simplified and easy to make.

To achieve the above object, the present invention provides a curvature adjustment structure of a curved liquid crystal display device, which comprises a backplane and at least one bracing assembly fixedly mounted to the backplane. Each bracing assembly comprises a first bracing member in contact engagement with the backplane, a second bracing member opposite to the first bracing member and distant from the backplane, and a cooling chip array arranged between the first and second bracing members. The cooling chip array comprises a plurality of cooling chips. Each of the cooling chips comprises a heat absorption surface and a heat dissipation surface opposite to the heat absorption surface. The heat absorption surface and the heat dissipation surface of each of the cooling chips are respectively in engagement with the first bracing member and the second bracing member, whereby through energizing the cooling chip array, the heat absorption surfaces and the heat dissipation surfaces respectively affect temperatures of the first bracing member and the second bracing member to cause thermal expansion and contraction of the first and second bracing members so as to achieve curving and deformation of the bracing assembly and make the bracing assembly forcibly change curvature of the backplane.

The curvature adjustment structure of the curved liquid crystal display device further comprises first and second temperature sensors respectively mounted to the first and second bracing members.

The heat absorption surfaces and the heat dissipation surfaces of adjacent ones of the cooling chips of the cooling chip array are arranged in opposite directions so that the heat absorption surfaces the adjacent cooling chips are respectively in contact engagement with the first and second bracing members and correspondingly, the heat dissipation surfaces of the adjacent cooling chips are respectively in contact engagement with the second and first bracing members. All the cooling chips of which the heat absorption surfaces are set in contact engagement with the first bracing member are grouped as a first cooling chip unit and all the cooling chips of which the heat absorption surfaces are set in contact engagement with the second bracing member are grouped as a second cooling chip unit, whereby each time energization is made to one of the first and second cooling chip units to allow the heat absorption surfaces and the heat dissipation surfaces to respectively affect the temperatures of the first bracing member and the second bracing member and cause the thermal expansion and contraction of the first and second bracing members to achieve the curving and deformation of the bracing assembly thereby making the bracing assembly forcibly change the curvature of the backplane.

The heat absorption surfaces and the heat dissipation surfaces of adjacent ones of the cooling chips of the cooling chip array are set in the same direction.

The cooling chips are each of a rectangular shape and are arranged in a uniformly spaced manner.

The cooling chips are thermoelectric semiconductor cooling chips and the cooling chips of the plurality of cooling chips of which the heat dissipation surfaces and the heat absorption surfaces are respectively in identical directions are electrically connected to each other.

The bracing assembly is fixedly mounted to the backplane through screwing connection, welding, or adhesive bonding.

The first and second bracing members are made of materials having great thermal expansion coefficients. The number of the bracing assembly is two and they are arranged in horizontal direction along upper and lower ends of the backplane.

The number of the bracing assembly is two and they are arranged in vertical direction along left and right side edges of the backplane.

The present invention also provides a curvature adjustment structure of a curved liquid crystal display device, which comprises a backplane and at least one bracing assembly fixedly mounted to the backplane, each bracing assembly comprising a first bracing member in contact engagement with the backplane, a second bracing member opposite to the first bracing member and distant from the backplane, and a cooling chip array arranged between the first and second bracing members, the cooling chip array comprising a plurality of cooling chips, each of the cooling chips comprising a heat absorption surface and a heat dissipation surface opposite to the heat absorption surface, the heat absorption surface and the heat dissipation surface of each of the cooling chips being respectively in engagement with the first bracing member and the second bracing member, whereby through energizing the cooling chip array, the heat absorption surfaces and the heat dissipation surfaces respectively affect temperatures of the first bracing member and the second bracing member to cause thermal expansion and contraction of the first and second bracing members so as to achieve curving and deformation of the bracing assembly and make the bracing assembly forcibly change curvature of the backplane;

further comprising first and second temperature sensors respectively mounted to the first and second bracing members;

wherein the cooling chips are each of a rectangular shape and are arranged in a uniformly spaced manner;

wherein the bracing assembly is fixedly mounted to the backplane through screwing connection, welding, or adhesive bonding;

wherein the cooling chips are thermoelectric semiconductor cooling chips and the cooling chips of the plurality of cooling chips of which the heat dissipation surfaces and the heat absorption surfaces are respectively in identical directions are electrically connected to each other; and wherein the first and second bracing members are made of materials having great thermal expansion coefficients.

The heat absorption surfaces and the heat dissipation surfaces of adjacent ones of the cooling chips of the cooling chip array are arranged in opposite directions so that the heat absorption surfaces the adjacent cooling chips are respectively in contact engagement with the first and second bracing members and correspondingly, the heat dissipation surfaces of the adjacent cooling chips are respectively in contact engagement with the second and first bracing members. All the cooling chips of which the heat absorption surfaces are set in contact engagement with the first bracing member are grouped as a first cooling chip unit and all the cooling chips of which the heat absorption surfaces are set in contact engagement with the second bracing member are grouped as a second cooling chip unit, whereby each time energization is made to one of the first and second cooling chip units to allow the heat absorption surfaces and the heat dissipation surfaces to respectively affect the temperatures of the first bracing member and the second bracing member and cause the thermal expansion and contraction of the first and second bracing members to achieve the curving and deformation of the bracing assembly thereby making the bracing assembly forcibly change the curvature of the backplane.

The heat absorption surfaces and the heat dissipation surfaces of adjacent ones of the cooling chips of the cooling chip array are set in the same direction.

The number of the bracing assembly is two and they are arranged in horizontal direction along upper and lower ends of the backplane.

The number of the bracing assembly is two and they are arranged in vertical direction along left and right side edges of the backplane.

The efficacy of the present invention is that the present invention provides a curvature adjustment structure of a curved liquid crystal display device, which comprises a cooling chip array arranged between first and second bracing members of a bracing assembly that is fixedly mounted to the backplane, whereby with Peltier effect, by energizing the cooling chip array and controlling the power supplied to the cooling chip array, heat absorption surfaces and heat dissipation surfaces of cooling chips respectively affect the temperatures of the first and second bracing members to cause thermal expansion and contraction of the first and second bracing members, thereby achieving curving deformation of the bracing assembly. The bracing assembly forces the backplane to change the curvature thereof thereby achieving easy and continuous adjustment of the curvature of the curved liquid crystal display device, allowing for improvement of the appeal of products to the market and making the structure simple and easy to make.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
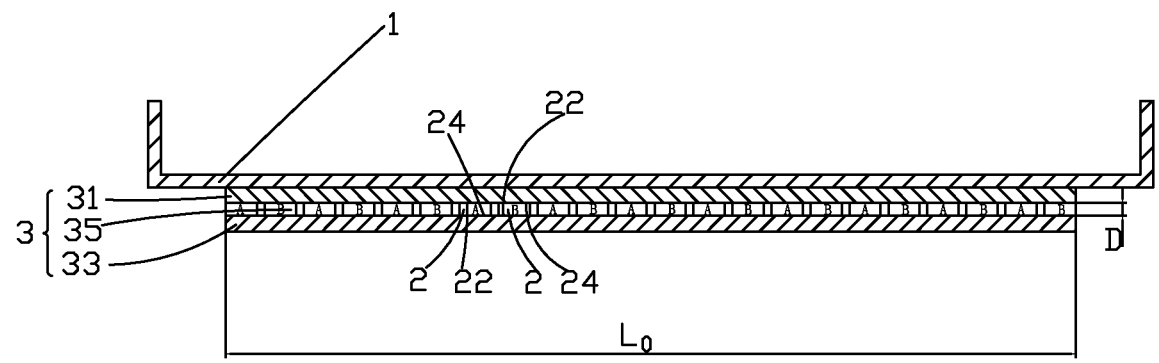
FIG. 1 is a top-side cross-sectional view showing a curvature adjustment structure of a curved liquid crystal display device according to a first embodiment of the present invention in which a backplane is in a condition of being not curved yet.
Figure 2:
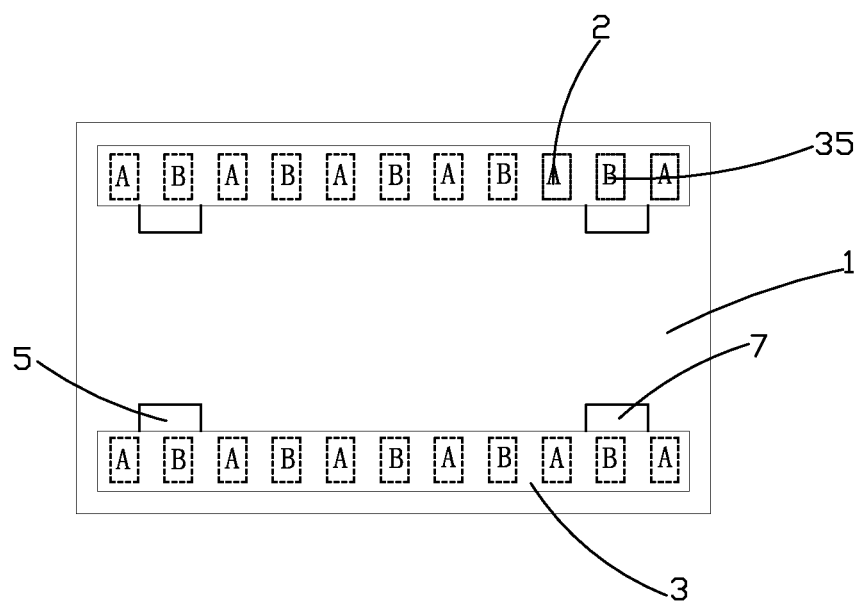
FIG. 2 is a front view showing the curvature adjustment structure of the curved liquid crystal display device according to the first embodiment of the present invention.

To further expound the technical solution adopted in the present invention and the advantages thereof, a detailed description is given to a preferred embodiment of the present invention and the attached drawings.

Referring to FIGS. 1-6, a first embodiment of a curvature adjustment structure of a curved liquid crystal display device according to the present invention is shown. The curvature adjustment structure of the curved liquid crystal display device comprises a backplane 1 and at least one bracing assembly 3 fixedly mounted to the backplane 1. Each bracing assembly 3 comprises a first bracing member 31 in contact engagement with the backplane 1, a second bracing member 33 opposite to the first bracing member 31 and distant from the backplane 1, and a cooling chip array 35 arranged between the first and second bracing members 31, 33. The number and location of the bracing assembly 3 can be arranged and adjusted according to the size of the curved liquid crystal display device and users' needs of watching. In the instant embodiment, the number of the bracing assembly 3 is two and they are set in the horizontal direction and mounted to upper and lower ends of the backplane 1. The bracing assembly 3 can be fixedly mounted to the backplane 1 through screwing connection, welding, or adhesive bonding.

The first and second bracing members 31, 33 are made of a material having a large thermal expansion coefficient to make them susceptible to thermal expansion and contradiction as being affected by temperature.

The cooling chip array 35 comprises a plurality of cooling chips 2 and the cooling chips 2 are each of a rectangular shape and are arranged in a uniformly spaced manner. Each of the cooling chips 2 comprises a heat absorption surface 22 and a heat dissipation surface 24 opposite to the heat absorption surface 22. The heat absorption surface 22 and the heat dissipation surface 24 of each of the cooling chips 2 are respectively in engagement with the first bracing member 31 and the second bracing member 33. In the instant embodiment, the heat absorption surfaces 22 and the heat dissipation surfaces 24 of adjacent cooling chips 2 of the cooling chip array 35 are arranged in opposite directions so that the heat absorption surfaces 22 of the adjacent cooling chips 2 are respectively in contact engagement with the first and second bracing members 31, 33 and correspondingly, the heat dissipation surfaces 24 of the adjacent cooling chips 2 are respectively in contact engagement with the second and first bracing members 33, 31. All the cooling chips 2 of which the heat absorption surfaces 22 are set in contact engagement with the first bracing member 31 are grouped as a first cooling chip unit A; and all the cooling chips 2 of which the heat absorption surfaces 22 are set in contact engagement with the second bracing member 33 are grouped as a second cooling chip unit B. The cooling chips 2 are thermoelectric semiconductor cooling chips and the cooling chips 2 are operated with Peltier effect. In other words, when an electrical current flows through a thermal couple, one node dissipates heat, while the other node absorbs heat. The cooling chips 2 of the first cooling chip unit A, of which the heat absorption surfaces 22 are set in contact engagement with the first bracing member 31, are electrically connected and the cooling chips 2 of the second cooling chip unit B, of which the heat absorption surfaces 22 are set in contact engagement with the second bracing member 33, are electrically connected.

Figure 3:
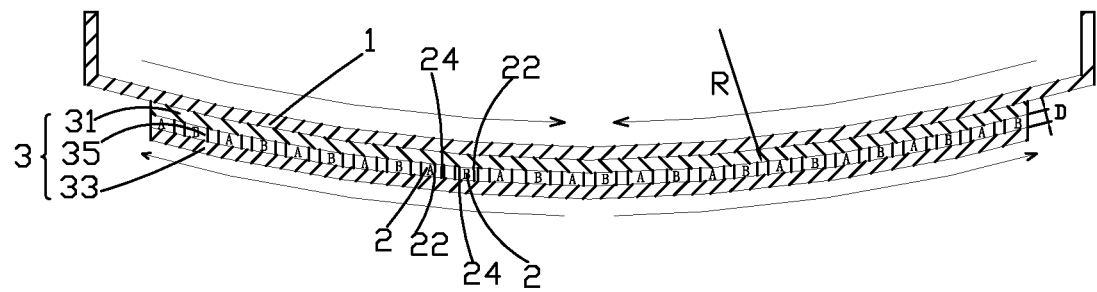
FIG. 3 is a top-side cross-sectional view showing a first cooling chip unit A of the curvature adjustment structure of the curved liquid crystal display device according to the first embodiment of the present invention is energized and the backplane is in a condition of being curved.
Figure 4:
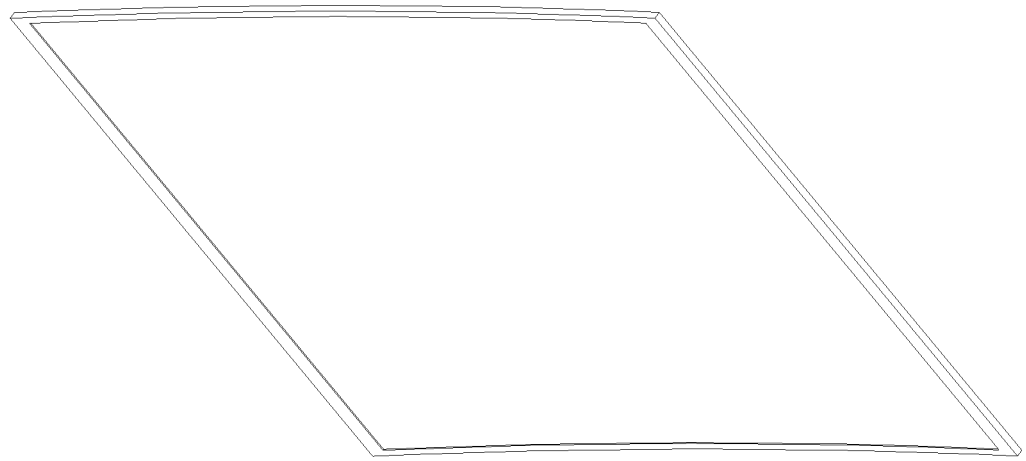
FIG. 4 is a perspective view showing the curved liquid crystal display device of the curvature adjustment structure of the curved liquid crystal display device according to the first embodiment of the present invention in a condition corresponding to FIG. 3.

As shown in FIG. 3, when the first cooling chip unit A is energized, while the second cooling chip unit B is not energized, the heat absorption surfaces 22 of the cooling chips 2 of the first cooling chip unit A that are set in contact engagement with the first bracing member 31 absorb heat, whereby the first bracing member 31 is cooled down with temperature reduced so as to undergo contraction; and correspondingly, the heat dissipation surfaces 24 that are set in contact with the second bracing member 33 dissipate heat, whereby the second bracing member 33 is heated with temperature rising and thus undergoes expansion. With the first bracing member 31 contracting and the second bracing member 33 expanding, the bracing assembly 3 becomes curving, with respect to the horizontal direction, toward the inner side of the backplane 1 and forces the backplane 1 that is fixed to the bracing assembly 3 to curve simultaneously. As shown in FIG. 4, the curved liquid crystal display device follows the curving of the backplane 1 to show, in the entirety thereof, a curved configuration, which is inward concave with respect to the horizontal direction.

Figure 5:
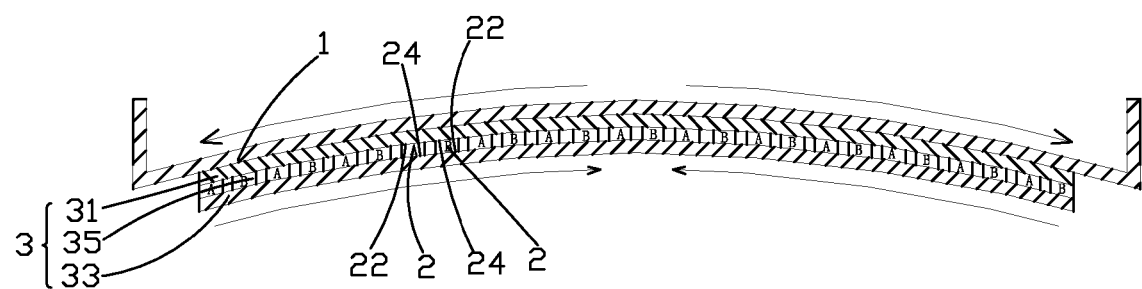
FIG. 5 is a top-side cross-sectional view showing a second cooling chip unit B of the curvature adjustment structure of the curved liquid crystal display device according to the first embodiment of the present invention is energized and the backplane is in a condition of being curved.
Figure 6:
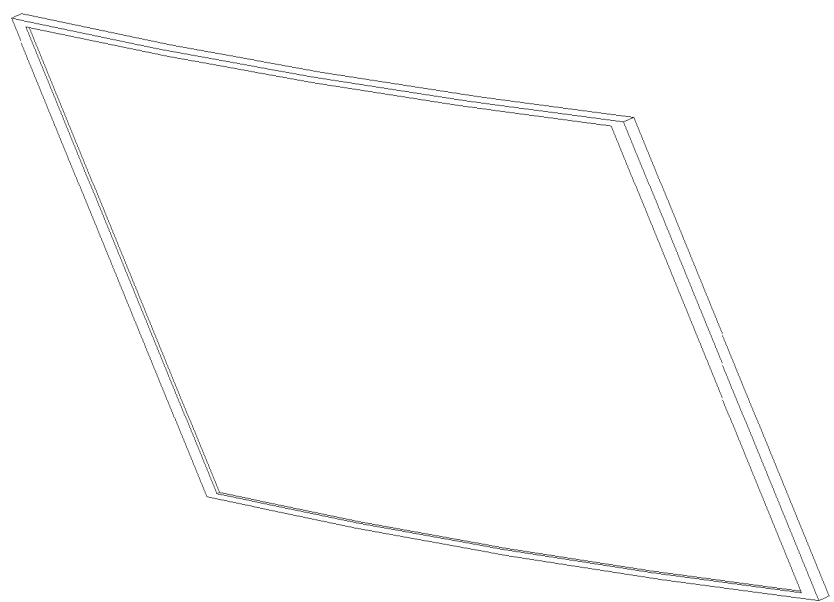
FIG. 6 is a perspective view showing the curved liquid crystal display device of the curvature adjustment structure of the curved liquid crystal display device according to the first embodiment of the present invention in a condition corresponding to FIG. 5.

As shown in FIG. 5, when the second cooling chip unit B is energized, while the first cooling chip unit A is not energized, the heat absorption surfaces 22 of the cooling chips 2 of the second cooling chip array B that is set in contact engagement with the second bracing member 33 absorb heat, whereby the second bracing member 33 is cooled down with temperature reduced so as to undergo contraction; and correspondingly, the heat dissipation surfaces 24 that are set in contact with the first bracing member 31 dissipate heat, whereby the first bracing member 31 is heated with temperature rising and thus undergoes expansion. With the first bracing member 31 expanding and the second bracing member 33 contracting, the bracing assembly 3 becomes curving, with respect to the horizontal direction, toward the outer side of the backplane 1 and forces the backplane 1 that is fixed to the bracing assembly 3 to curve simultaneously. As shown in FIG. 6, the curved liquid crystal display device follows the curving of the backplane 1 to show, in the entirety thereof, a curved configuration, which is outward convex with respect to the horizontal direction.

The curvature adjustment structure of the curved liquid crystal display device according to the present invention may further comprises first and second temperature sensors 5, 7 that are respectively mounted to the first and second bracing members 31, 33. The first and second temperature sensors 5, 7 are respectively mounted to side surfaces of the first and second bracing members 31, 33 to detect the temperatures of the first and second bracing members 31, 33. The temperatures of the first and second bracing members 31, 33 can be controlled by controlling the power of the first or second cooling chip unit A, B in order to control the amount of contraction and expansion of the first and second bracing members 31, 33 and eventually control the curvature of the backplane 1 and thus the curvature of the curved liquid crystal display device to achieve easy, continuous, and efficient adjustment of the curvature of the curved liquid crystal display device. Taking FIGS. 1 and 3 as an example, a specific analysis is given as follows. The first and second bracing members 31, 33 have lengths that are $L_0$ at an initial temperature $T_0$ and the distance between the first and second bracing members 31, 33 is D. After the first cooling chip unit A is energized, the temperatures of the first and second bracing members 31, 33 become $T_1$, $T_2$, respectively, due to influence caused by the first cooling chip unit A. The thermal expansion coefficients of the first and second bracing members 31, 33 are both K and the lengths of them become $L_1$, $L_2$, respectively. The radius of the first bracing member 31 after curving is R. Then, the radius of the second bracing member 33, after curving, becomes (R+D). According to the formulas of thermal expansion coefficients, the following is obtained:

$$L_1 = L_0 + L_0 \times K \times (T_1 - T_0)$$

$$L_2 = L_0 + L_0 \times K \times (T_2 - T_0)$$

Geometric analysis provides the following:

$$R/(R+D) = L_1/L_2$$

Combining the above three formulas to solve for R would give the following solution:

$$R = D \times [1 + K(T_1 - T_0)]/[K(T_2 - T_1)]$$

It can be seen that the radius R of the first bracing member 31 after curving is related to the temperatures of the first and second bracing members 31, 33. By controlling the power supplied to the first or second cooling chip unit A, B, the temperatures of the first and second bracing members 31, 33 can be controlled to set the bracing assembly 3 is different curved condition thereby enabling easy and continuous adjustment of the curvature of the backplane 1. Further, the cooling chip array 35 can reach a desired temperature in a very quick manner so that adjustment of curvature can be achieved quickly.

Figure 7:
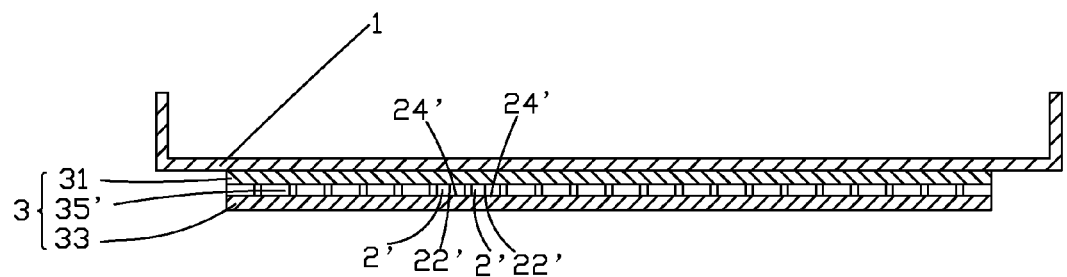
FIG. 7 is a top-side cross-sectional view showing a curvature adjustment structure of a curved liquid crystal display device according to a second embodiment of the present invention in which a backplane is in a condition of being not curved yet.
Figure 8:
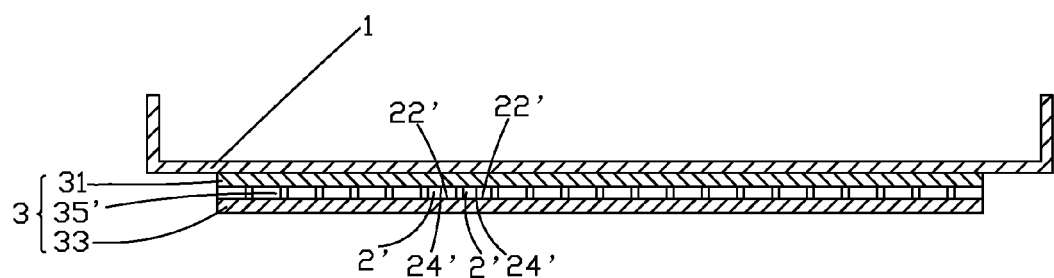
FIG. 8 is a top-side cross-sectional view showing a curvature adjustment structure of a curved liquid crystal display device according to a third embodiment of the present invention in which a backplane is in a condition of being not curved yet.

Referring to FIGS. 7 and 8, which respectively show second and third embodiments of the curvature adjustment structure of the curved liquid crystal display device according to the present invention, both embodiments are different from the first embodiment in that the heat absorption surface 22' and the heat dissipation surface 24' of adjacent cooling chips 2' of the cooling chip array 35' are oriented in the same directions. As shown in FIG. 7, in the second embodiment, the heat absorption surfaces 22' of the adjacent cooling chips 2' are both set in contact engagement with the first bracing member 31 and correspondingly, the heat dissipation surfaces 24' of the adjacent cooling chips 2' are both set in contact engagement with the second bracing member 33. All the cooling chips 2' contained in the cooling chip array 35' are electrically connected to each other. Energizing the cooling chip array 35' would achieve curving of the backplane 1 as shown in FIG. 3.

As shown in FIG. 8, in the third embodiment, the heat absorption surfaces 22' of the adjacent cooling chips 2' are both set in contact engagement with ∓ the second bracing member 33 and correspondingly, the heat dissipation surfaces 24' of the cooling chips 2' are both set in contact engagement with the first bracing member 31. All the cooling chips 2' contained in the cooling chip array 35' are electrically connected to each other. Energizing the cooling chip array 35' would achieve curving of the backplane 1 as shown in FIG. 5.

Figure 9:
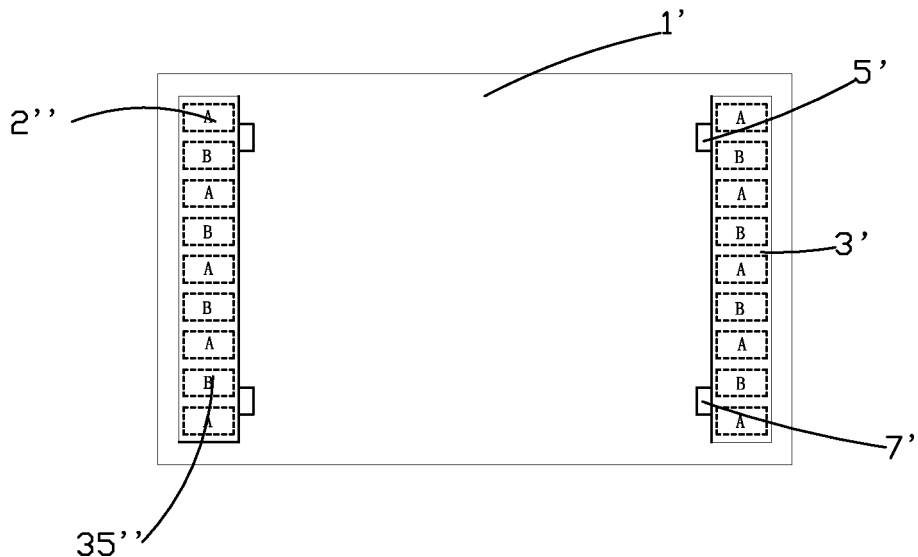
FIG. 9 is a front view showing a curvature adjustment structure of a curved liquid crystal display device according to the fourth embodiment of the present invention.
Figure 10:
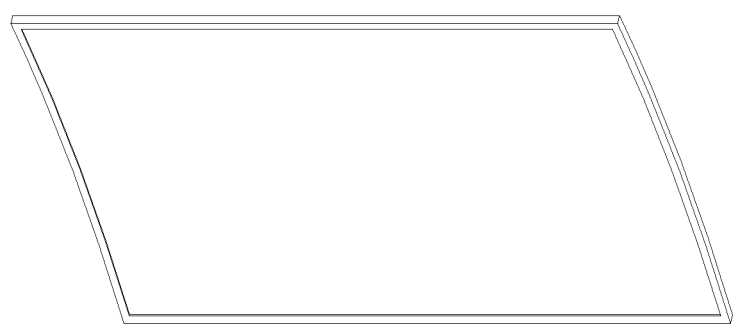
FIG. 10 is a perspective view showing the curved liquid crystal display device in a condition where a first cooling chip unit A of the curvature adjustment structure of the curved liquid crystal display device according to the fourth embodiment is energized.
Figure 11:
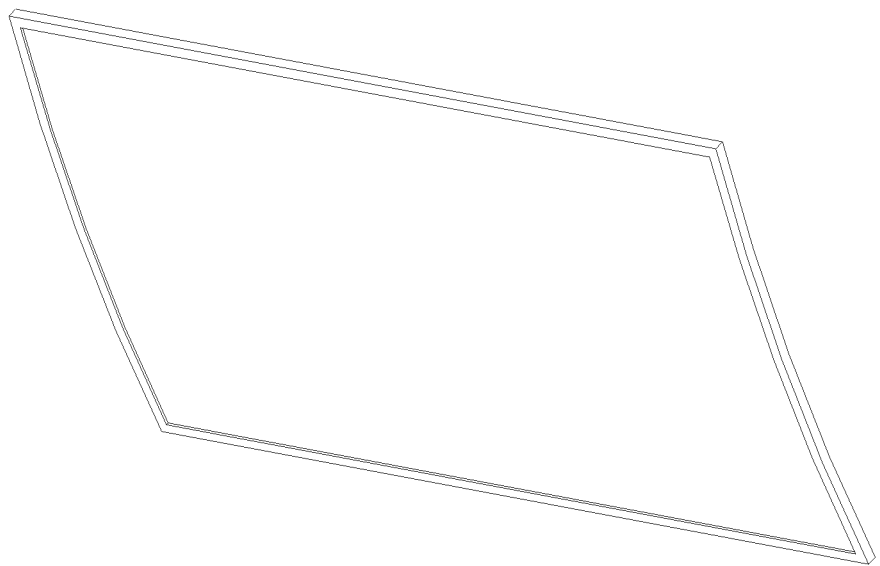
FIG. 11 is a perspective view showing the curved liquid crystal display device in a condition where a second cooling chip unit B of the curvature adjustment structure of the curved liquid crystal display device according to the fourth embodiment is energized.

Referring to FIGS. 9-11, a fourth embodiment of the curvature adjustment structure of the curved liquid crystal display device according to the present invention is shown and is different from the first embodiment in that the number of the bracing assembly 3' is two, which are arranged in vertical direction along left and right side edges of the backplane 1'. When the first cooling chip unit A of the cooling chip array 35" is energized, it may achieve that the curved liquid crystal display device, in the entirety thereof, becomes a curved form and is inward concave with respect to the vertical direction; and when the second cooling chip unit B of the cooling chip array 35" is energized, it may achieve that the curved liquid crystal display device, in the entirety thereof, becomes a curved form and is outward convex with respect to the vertical direction. The process is similar to that of the first embodiment and repeated description will be omitted.

In summary, the present invention provides a curvature adjustment structure of a curved liquid crystal display device, which comprises a cooling chip array arranged between first and second bracing members of a bracing assembly that is fixedly mounted to the backplane, whereby with Peltier effect, by energizing the cooling chip array and controlling the power supplied to the cooling chip array, heat absorption surfaces and heat dissipation surfaces of cooling chips respectively affect the temperatures of the first and second bracing members to cause thermal expansion and contraction of the first and second bracing members, thereby achieving curving deformation of the bracing assembly. The bracing assembly forces the backplane to change the curvature thereof thereby achieving easy and continuous adjustment of the curvature of the curved liquid crystal display device, allowing for improvement of the appeal of products to the market and making the structure simple and easy to make.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A curvature adjustment structure of a curved liquid crystal display device, comprising a backplane and at least one bracing assembly fixedly mounted to the backplane, each bracing assembly comprising a first bracing member in contact engagement with the backplane, a second bracing member opposite to the first bracing member and distant from the backplane, and a cooling chip array arranged between the first and second bracing members, the cooling chip array comprising a plurality of cooling chips, each of the cooling chips comprising a heat absorption surface and a heat dissipation surface opposite to the heat absorption surface, the heat absorption surface and the heat dissipation surface of each of the cooling chips being respectively in engagement with the first bracing member and the second bracing member, whereby through energizing the cooling chip array, the heat absorption surfaces and the heat dissipation surfaces respectively affect temperatures of the first bracing member and the second bracing member to cause thermal expansion and contraction of the first and second bracing members so as to achieve curving and deformation of the bracing assembly and make the bracing assembly forcibly change curvature of the backplane.

2. The curvature adjustment structure of the curved liquid crystal display device as claimed in claim 1 further comprising first and second temperature sensors respectively mounted to the first and second bracing members.

3. The curvature adjustment structure of the curved liquid crystal display device as claimed in claim 1, wherein the heat absorption surfaces and the heat dissipation surfaces of adjacent ones of the cooling chips of the cooling chip array are arranged in opposite directions so that the heat absorption surfaces the adjacent cooling chips are respectively in contact engagement with the first and second bracing members and correspondingly, the heat dissipation surfaces of the adjacent cooling chips are respectively in contact engagement with the second and first bracing members, all the cooling chips of which the heat absorption surfaces are set in contact engagement with the first bracing member being grouped as a first cooling chip unit, all the cooling chips of which the heat absorption surfaces are set in contact engagement with the second bracing member being grouped as a second cooling chip unit, whereby each time energization is made to one of the first and second cooling chip units to allow the heat absorption surfaces and the heat dissipation surfaces to respectively affect the temperatures of the first bracing member and the second bracing member and cause the thermal expansion and contraction of the first and second bracing members to achieve the curving and deformation of the bracing assembly thereby making the bracing assembly forcibly change the curvature of the backplane.

4. The curvature adjustment structure of the curved liquid crystal display device as claimed in claim 1, wherein the heat absorption surfaces and the heat dissipation surfaces of adjacent ones of the cooling chips of the cooling chip array are set in the same direction.

5. The curvature adjustment structure of the curved liquid crystal display device as claimed in claim 1, wherein the cooling chips are each of a rectangular shape and are arranged in a uniformly spaced manner.

6. The curvature adjustment structure of the curved liquid crystal display device as claimed in claim 1, wherein the cooling chips are thermoelectric semiconductor cooling chips and the cooling chips of the plurality of cooling chips of which the heat dissipation surfaces and the heat absorption surfaces are respectively in identical directions are electrically connected to each other.

7. The curvature adjustment structure of the curved liquid crystal display device as claimed in claim 1, wherein the bracing assembly is fixedly mounted to the backplane through screwing connection, welding, or adhesive bonding.

8. The curvature adjustment structure of the curved liquid crystal display device as claimed in claim 1, wherein the first and second bracing members are made of materials having great thermal expansion coefficients.

9. The curvature adjustment structure of the curved liquid crystal display device as claimed in claim 1, wherein the number of the bracing assembly is two and they are arranged in horizontal direction along upper and lower ends of the backplane.

10. The curvature adjustment structure of the curved liquid crystal display device as claimed in claim 1, wherein the number of the bracing assembly is two and they are arranged in vertical direction along left and right side edges of the backplane.

11. A curvature adjustment structure of a curved liquid crystal display device, comprising a backplane and at least one bracing assembly fixedly mounted to the backplane, each bracing assembly comprising a first bracing member in contact engagement with the backplane, a second bracing member opposite to the first bracing member and distant from the backplane, and a cooling chip array arranged between the first and second bracing members, the cooling chip array comprising a plurality of cooling chips, each of the cooling chips comprising a heat absorption surface and a heat dissipation surface opposite to the heat absorption surface, the heat absorption surface and the heat dissipation surface of each of the cooling chips being respectively in engagement with the first bracing member and the second bracing member, whereby through energizing the cooling chip array, the heat absorption surfaces and the heat dissipation surfaces respectively affect temperatures of the first bracing member and the second bracing member to cause thermal expansion and contraction of the first and second bracing members so as to achieve curving and deformation of the bracing assembly and make the bracing assembly forcibly change curvature of the backplane;

further comprising first and second temperature sensors respectively mounted to the first and second bracing members;

wherein the cooling chips are each of a rectangular shape and are arranged in a uniformly spaced manner;

wherein the bracing assembly is fixedly mounted to the backplane through screwing connection, welding, or adhesive bonding;

wherein the cooling chips are thermoelectric semiconductor cooling chips and the cooling chips of the plurality of cooling chips of which the heat dissipation surfaces and the heat absorption surfaces are respectively in identical directions are electrically connected to each other; and wherein the first and second bracing members are made of materials having great thermal expansion coefficients.

12. The curvature adjustment structure of the curved liquid crystal display device as claimed in claim 11, wherein the heat absorption surfaces and the heat dissipation surfaces of adjacent ones of the cooling chips of the cooling chip array are arranged in opposite directions so that the heat absorption surfaces the adjacent cooling chips are respectively in contact engagement with the first and second bracing members and correspondingly, the heat dissipation surfaces of the adjacent cooling chips are respectively in contact engagement with the second and first bracing members, all the cooling chips of which the heat absorption surfaces are set in contact engagement with the first bracing member being grouped as a first cooling chip unit, all the cooling chips of which the heat absorption surfaces are set in contact engagement with the second bracing member being grouped as a second cooling chip unit, whereby each time energization is made to one of the first and second cooling chip units to allow the heat absorption surfaces and the heat dissipation surfaces to respectively affect the temperatures of the first bracing member and the second bracing member and cause the thermal expansion and contraction of the first and second bracing members to achieve the curving and deformation of the bracing assembly thereby making the bracing assembly forcibly change the curvature of the backplane.

13. The curvature adjustment structure of the curved liquid crystal display device as claimed in claim 11, wherein the heat absorption surfaces and the heat dissipation surfaces of adjacent ones of the cooling chips of the cooling chip array are set in the same direction.

14. The curvature adjustment structure of the curved liquid crystal display device as claimed in claim 11, wherein the number of the bracing assembly is two and they are arranged in horizontal direction along upper and lower ends of the backplane.

15. The curvature adjustment structure of the curved liquid crystal display device as claimed in claim 11, wherein the number of the bracing assembly is two and they are arranged in vertical direction along left and right side edges of the backplane.

\* \* \* \* \*